United States Patent Office 3,454,509
Patented July 8, 1969

3,454,509
CASTOR OIL MODIFIED ACRYLIC COATING COMPOSITIONS
John S. Fry, Somerville, N.J., assignor to Union Carbide Corporation, a corporation of New York
No Drawing. Filed Dec. 14, 1965, Ser. No. 513,823
Int. Cl. C08f 37/16; C08g 37/18, 37/32
U.S. Cl. 260—19
3 Claims

ABSTRACT OF THE DISCLOSURE

Acrylic coating compositions which cure at low bake temperatures, i.e., at 180° F. to 250° F., were prepared by adding castor oil or a derivative thereof as a reactive flexibilizer to acrylic coating compositions which normally require bake temperatures of 250–400° F. to effect cure.

---

This invention relates to novel coating compositions and more particularly to acrylic coating compositions which afford a useful combination of flexibility and hardness without sacrificing water, aromatic solvent or gasoline resistance when crosslinked or cured through baking at very low baking temperatures, that is, baking temperatures of 180–250° F.

Various thermosetting acrylic composition are known to produce coatings having many useful applications. However, the delicate balance of the components of such acrylic compositions is easily upset when attempting to make compositional variations to enhance even a single property of the baked, crosslinked product. Still more subtle variations are present in the environmental conditions used to effect the baking step. Thus, an acrylic composition which affords a thermoset product with satisfactory water and solvent resistance after baking at 250–400° F., conventional baking temperatures, suffers a decrease in water resistance if cured at the more convenient baking range of 180–250° F.

A highly desirable coating composition, therefore, will exhibit the following features upon crosslinking or curing by baking at 180–250° F. for about 20 to 40 minutes.

(1) Resistance to water, aromatic solvents and gasoline.

(2) Pass the Mandrel Test (ASTM D–522–41, described in detail hereinafter). No cracking or crazing of the cured coating will occur upon rapid bending of a coated panel.

(3) Pass the Gardner impact resistance test, i.e., withstand at least 28 inch-pounds upon impact without cracking or peeling on the concave side of the indentation.

The coating compositions of this invention which provide the above-listed features and advantages comprise:

(1) An interpolymer of:
(a) From 0 to about 90% by weight of a combined monovinyl aromatic hydrocarbon containing from 8 to 11 carbon atoms inclusive:
(b) From about 10 to 90 percent by weight of at least one combined alkyl acrylate having between 4 and 15 carbon atoms, bicycloheptyl acrylate, alkyl methacrylate having between 5 and 15 carbon atoms, cyanoethyl acrylate, acrylamide, N,N-dialkyl acrylamide, N-alkyl acrylamide, $\alpha,\beta$-olefinically unsaturated nitrile, vinyl acetate, vinyl chloride, vinyl fluoride, vinylidene chloride or vinylidene fluoride; and
(c) From about 1 to 20 percent by weight of combined $\alpha,\beta$-olefinically unsaturated carboxylic acid containing up to about 10 carbon atoms, ethylene glycol monoacrylate or monomethacrylate, propylene glycol monoacrylate or monomethacrylate or trimethylolpropane monoallyl ether, said interpolymer having a reduced viscosity of about 0.1 to 0.8 when measured as a 0.2 g. sample in 100 ml. of tetrahydrofuran at 25° C. and a glass transition temperature above about 20° C.;

(2) From about 1 to 30 percent by weight based on the weight of interpolymer of a reactive flexibilizer selected from the class consisting of castor oil, polymerized castor oil, ricinoleic acid, ricinoleyl alcohol and hydroxyalkyl ricinoleates; and (3) From about 5 to 35 percent by weight, based on the weight of interpolymer of a potentially thermosetting resin formed by the condensation of formaldehyde with phenols, melamine and an alkanol, urea or benzoguanamine.

The coating compositions of the present inveniton can be formulated as solutions in any conventional mixing equipment well known in the art using common organic solvents as for example, ethers such as dioxane, ethylene glycol monoethyl ether and the like; ketones such as methyl ethyl ketone, diethyl ketone and the like; esters such as methyl acetate, ethyl acetate, methyl propionate and the like; alkanols such as isopropyl alcohol, butyl alcohol and the like; and aromatics such as toluene, xylenes and the like; as well as mixtures of these solvents.

Pigments and dyes can also be incorporated in these formulations using known art methods.

If desired, silicone containing leveling and defoaming agents can also be added to these formulations.

It is preferred to employ an acid catalyst or the ammonium salt of an acid catalyst in the claimed coating compositions to effect their efficient cure at low baking temperatures. Acids such as p-toluenesulfonic acid, phosphoric acid or mono alkyl phosphoric acids, such as butyl phosphoric acid, are particularly preferred in concentrations of about 0.025 to 2% by weight based on the weight of interpolymer.

The preferred potentially thermosetting resins of this invention are polymethyl ethers of polymethylol melamines.

The polymethyl ethers of polymethylol melamines are well known in the art as are methods for preparing them. Reference is made to U.S. 3,065,109 which discloses their preparation. Ploymethylol melamines can be prepared by reacting one mol of melamine with at least two mols of formaldehyde. A fully methylolated melamine, such as hexamethylol melamine, can be prepared by reacting at least six mols of formaldehyde with one mol of melamine. In order to obtain the desired methyl ether, the polymethylol melamines thus produced are reacted with the requisite amount of methanol. Thus, for example, reacting two mols of methanol with one mol of a dimethylol melamine results in the formation of the dimethyl ether of dimethylol melamine. Higher methylol melamines can be reacted with from two to six mols of methanol as determined by the number of available methylol groups and the degree of etherification desired. For example, starting with tetramethylol melamine, it is possible to prepare the dimethyl ether and the tetramethyl ether. It is also possible to produce, as a further illustration, a trimethyl and pentamethyl ether of hexamethylol melamine. Upon complete etherification of hexamethylol melamine, the hexamethyl ether or hexamethoxymethyl melamine is produced.

Hexamethoxymethyl melamine is the preferred polymethylol melamine in this invention although others can be used. Hexamethoxymethyl melamine is sparingly soluble in water, readily soluble in low molecular weight ketones, esters, alcohols, nitromethane, and similar polar solvents. It is substantially insoluble in aliphatic hydrocarbons, but is soluble in aromatic hydrocarbons. An aqueous solution of this compound can be freely diluted with water soluble polar solvents such as methanol, ethanol, isopropanol, acetone and the like. Hexamethoxymethyl melamine can be represented by the formula:

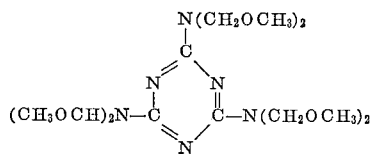

The reactive flexibilizers used in the present invention are not plasticizers but rather are incorporated into the coating composition during the baking operation at about 180–250° F. to form an integral part of the baked coating. This action results in an enhancement of the impact strength with little or no reduction in hardness whereas a plasticizer is inefficient as a flexibilizer in these thermosetting systems while at the same time reducing hardness and chemical resistance.

The invention is further illustrated by the examples which follow in which all parts and percentages are by weight unless otherwise specified.

The following tests were employed:

Water resistance.—(ASTM D–870–54): Water immersion test.

Solvent resistance.—A steel test panel was coated and rubbed with gasoline, ethyl alcohol or toluene. The coated panels were then visually inspected for softening or removal of the coating assigning a rating of 1–10 where a coating having complete resistance has a value of 10, a coating which is softened but not removable from the panel of 5–10 and 0–5 to coatings which can be removed from the panel.

Impact resistance.—The Gardner impact test was used wherein a coating is rapidly distended by dropping a known weight through a known distance onto a coated panel, causing a deep hemispherical indentation.

Mandrel test.—(ASTM D–522–41): As a check on the balance of adhesion against distensibility, a coated panel is rapidly bent through a 180° angle in a conical shape measuring ⅛ inch to 2¼ inches from the apex of the cone to the base. No cracking or crazing of the coating should occur.

Pencil hardness.—A series of KOH–I–NOR pencils ranging in hardness from 6B, the softest, to 9H, the hardest, is used to scratch the surface of a coated panel at a 45° angle. The hardness of the coating is expressed in terms of the hardest pencil which does not scratch the coating.

Some of the examples also demonstrate the utility of the claimed coating composition at conventional baking temperatures.

EXAMPLE 1

*Preparation of an acrylic interpolymer*

To a dropping funnel, there was charged (parts by weight):

| | Parts |
|---|---|
| Styrene | 50 |
| Methyl methacrylate | 60 |
| Ethyl acrylate | 70 |
| Acrylic acid | 10 |
| Propylene glycol monoacrylate | 10 |
| Ethylene glycol monoethyl ether | 134 |
| Benzoyl peroxide | 8 |
| t-Dodecyl mercaptan | 0.8 |

After the peroxide was dissolved in the monomer solution, the contents of the funnel were metered over one hour into a one liter flask equipped with a reflux condenser, stirrer and heating mantel. The temperature of the reaction was held to 95–100° C. during the metering period.

The reaction was held for a further five hours at 106° C. and then cooled to yield a solution containing 66% by weight of interpolymer.

EXAMPLE 2

Coating compositions using the interpolymer solution prepared in Example 1 were formulated as follows:

| | A | B | Control |
|---|---|---|---|
| Interpolymer solution | 30.3 | 30.3 | 30.3 |
| Hexamethoxymethyl melamine | 4.5 | 4.0 | 4.0 |
| Castor oil (Baker DB grade) | 1.5 | 1.0 | None |
| p-Toluenesulfonic acid (20% in isopropanol) | 0.4 | 0.4 | 0.4 |
| Toluene | 15.0 | 15.0 | 15.0 |

One set of cold rolled steel panels was coated with the above formulation using a drawn down doctor blade, air dried for 30 minutes and baked for 20 minutes at 135° C. A second set was prepared in the same manner except for the baking temperature which was 105° C. instead of 135° C.

These coated panels were then evaluated. The results obtained and presented in Tables I and II demonstrate the superior flexibility of the formulations containing castor oil achieved with no loss in other properties.

TABLE I.—COATED PANELS AFTER 135° C. BAKE

| | A | B | Control |
|---|---|---|---|
| 5 Min. solvent resistance (gasoline) | 10 | 10 | 10 |
| 5 Min. solvent resistance (ethanol) | 10 | 10 | 10 |
| Gardner impact strength (inch lbs.) | 60 | 70 | 20 |
| Pencil hardness | 2–3H | 2H | 2–3H |

TABLE II.—COATED PANELS AFTER 105° C. BAKE

| | A | B | Control |
|---|---|---|---|
| 5 Min. solvent resistance (gasoline) | 10 | 10 | 10 |
| 5 min. solvent resistance (ethanol) | 10 | 10 | 10 |
| Gardner impact strength (inch lbs.) | 100 | 100 | 20 |
| Pencil hardness | 2H | 2H | 2H |

EXAMPLE 3

An interpolymer of 45 parts styrene, 40 parts ethyl acrylate and 15 parts ethylene glycol monoacrylate was prepared by the method described in Example 1 to afford a solution containing 60% solids.

EXAMPLE 4

Coating compositions using the interpolymer solution prepared in Example 3 were formulated as follows:

| | Parts | |
|---|---|---|
| | A | Control |
| Example 3 interpolymer solution | 33.4 | 33.4 |
| Hexamethoxymethyl melamine | 5.0 | 5.0 |
| Castor oil (Baker DB grade) | 3.0 | |
| p-Toluenesulfonic acid (20% in isopropanol) | 1.6 | 1.6 |
| Toluene | 10.0 | 10.0 |

Cold rolled steel panels were coated as in Example 2 and baked for 30 minutes at 95° C. Both the A and Control formulations exhibited excellent resistance to toluene, gasoline, and ethanol and had a pencil hardness of 3–4H, but while formulation 4A had a Gardner impact strength of 50 inch pounds, Control 4 could pass only a Gardner impact strength test of 20 inch pounds.

EXAMPLE 5

The procedure of Example 1 was used to prepare a solution of an interpolymer containing 28 parts styrene, 28 parts methyl methacrylate, 36 parts ethyl acrylate and 8 parts acrylic acid at a solids content of 62%.

EXAMPLE 6

Coating compositions using the interpolymer solution prepared in Example 5 were formulated as follows:

| | Parts | |
|---|---|---|
| | A | Control |
| Example 5 interpolymer solution | 32.3 | 32.3 |
| Hexamethoxymethyl melamine | 4.0 | 4.0 |
| Castor oil | 1.0 | 0.0 |
| p-Toluenesulfonic acid (20% solution in isopropanol) | 0.4 | 0.4 |
| Toluene | 15.0 | 15.0 |

Coatings were prepared as in Example 2 and baked for 20 minutes at 135° C. Both formulation 6A and Control 6 had about the same hardness and resistance to solvent attack, but formulation 6A passed a Gardner impact of 50 inch pounds while the Control 6 formulation could pass an impact of only 20 inch pounds.

EXAMPLE 7

The procedure of Example 1 was used to prepare a solution of an interpolymer containing 45 parts of styrene, 43 parts of butyl acrylate, 7 parts of acrylic acid and 5 parts of propylene glycol monoacrylate at a solids content of 60%.

EXAMPLE 8

Coating compositions using the interpolymer solution prepared in Example 7 were formulated as follows:

|  | Parts | | | |
|---|---|---|---|---|
|  | A | B | C | Control |
| Example 7 interpolymer solution | 33.4 | 33.4 | 33.4 | 33.4 |
| Hexamethoxymethyl melamine | 5.0 | 5.0 | 5.0 | 5.0 |
| Castor oil | 3.0 | | | |
| Ethylene glycol monohydroxystearate | | 3.0 | | |
| 12-hydroxystearic acid | | | 3.0 | |
| p-Toluenesulfonic acid (20% solution in isopropanol) | 0.2 | 0.2 | 0.2 | 0.2 |
| Toluene | 15.0 | 15.0 | 15.0 | 15.0 |

Coatings were prepared as in Example 2 and baked for 20 minutes at 175° C. All formulations were resistant to acetone, gasoline and ethanol. The Control 8 formulation could not pass any impact test and cracked upon bending over an ⅛" mandrel. The other formulations, 8A, B, and C passed Gardner impact tests of 70, 40 and 30 inch pounds, respectively, and did not crack when bent over an ⅛" mandrel. These data demonstrate that not only castor oil itself is effective as a reactive flexibilizing agent, but that its derivatives can also be used in a similar function.

EXAMPLE 9

The procedure of Example 1 was used to prepare a solution of an interpolymer containing 35 parts of methyl methacrylate, 55 parts of ethyl acrylate and 10 parts of acrylic acid at a solids content of 64.9%.

EXAMPLE 10

Coating compositions using the interpolymer solution prepared in Example 9 were formulated as follows:

|  | Parts | | |
|---|---|---|---|
|  | A | B | Control |
| Example 9 interpolymer solution | 27.8 | 27.8 | 27.8 |
| Hexamethoxymethyl melamine | 5.4 | 5.4 | 5.4 |
| Ricinoleic acid | 3.6 | | |
| Ricinoleyl alcohol | | 3.0 | |
| Ammonium hydroxide (28%) | 20.0 | 20.0 | 20.0 |
| p-Toluenesulfonic acid (20% solution in isopropanol) | 0.2 | 0.2 | 0.2 |

Coatings were prepared as in Example 2 and baked for 30 minutes at 175° C. All formulations exhibited the same chemical resistance. The Control 10 formulation passed a Gardner impact test of 80 inch pounds while the modified formulations 10A and B passed impact tests of 120 and 110 inch pounds, respectively.

EXAMPLES 11–15

A series of resins prepared as in Example 1 and formulated as in Example 2 was cured at temperatures ranging from 95° C. to 135° C. Coated panels having an average film thickness of about 1.2 mils were obtained. The monomers used in the resin preparation included styrene, methyl methacrylate, ethyl acrylate, butyl acrylate, acrylic acid, hydroxypropyl acrylate, hydroxyethyl methacrylate and hydroxypropyl methacrylate in various combinations. All of the coatings obtained were resistant to gasoline and ethanol. The resistance of these coatings to a 5-minute immersion in toluene, their Gardner impact strength and pencil hardness are all shown in Table III together with pertinent formulation data. An examination of these data indicates the enhanced toluene resistance, impact strength and hardness of these coatings resulting from the incorporation of castor oil in them.

Although the invention has been described in its preferred forms with a certain degree of particularity, it is understood that the present disclosure has been made only by way of example, and that numerous changes can be made without departing from the spirit and scope of the invention.

TABLE III

| Base Resin | (A) PPH | Castor oil, PPH | Catalyst, PPH (B) | Bake cycle, min./temp. | Toluene, 5 min. | Gard. imp., in./lbs. | Pencil Hardness |
|---|---|---|---|---|---|---|---|
| Example: |  |  |  |  |  |  |  |
| 11 .......... STY26, MMA28, EA36, AA10 | 20 | Control 11 | 0.5 | 30/105 | 0 | 30 | 2–3H |
|  | 20 | 5 | 1.6 | 30/105 | 6 | 50 | 2H |
|  | 20 | 5 | 0.4 | 20/135 | 10 | 40 | 2–3H |
|  | 20 | 5 | 0.6 | 30/105 | 7 | 80 | 2H |
|  | 20 | 5 | 1.6 | 30/95 | 0 | 30 | 2H |
| 12 .......... STY25, MMA30, EA35, HPA7, AA3 | 20 | Control 12 | 0.4 | 30/105 | 0 | 30 | 3H– |
|  | 22.5 | 7.5 | 0.4 | 20/135 | 10 | 40 | 2H |
|  | 22.5 | 7.5 | 0.4 | 30/105 | 3 | 40 | 2H– |
|  | 22.5 | 7.5 | 1.6 | 30/105 | 6 | 20 | 2H |
|  | 20 | 5 | 0.6 | 30/105 | 7 | 100 | 2H |
| 13 .......... STY27, MMA28, EA35, HPA4, AA6 | 20 | Control 13 | 0.4 | 30/105 | 0 | 30 | 2–3H |
|  | 20 | 5 | 1.6 | 30/105 | 7 | 50 | 2H |
|  | 20 | 5 | 0.4 | 20/135 | 8 | 40 | 2–3H |
|  | 20 | 5 | 0.4 | 30/105 | 6 | 40 | 2–3H |
|  | 20 | 5 | 1.6 | 30/95 | 0 | 40 | 2–3H |
|  | 20 | 5 | 0.6 | 30/105 | 8 | 80 | 2–3H |
|  | 29 | 5 | 0.6 | 20/135 | 10 | 50 | 2–3H |
| 14 .......... MMA50, EA40, HPA4, AA6 | 20 | Control 14 | 1.0 | 30/105 | 8 | 0 | 2H+ |
|  | 20 | 5 | 1.0 | 30/105 | 8 | 80 | 2H+ |
|  | 20 | 5 | 0.6 | 30/105 | 8 | 120 | 2H |
|  | 20 | 5 | 0.6 | 20/135 | 10 | 60 | 3H |
| 15 .......... STY40, MMA10, EA40, HPA6, AA4 | 20 | Control 15 | ¹ 0.8 | 30/122 | 0 | 50 | 2–3H |
|  | 20 | 5 | ¹ 0.8 | 30/122 | 0 | 80 | 2H |

¹ Butyl phosphoric acid.
A = Hexamethoxymethyl melamine.
B = The catalyst used was p-toluene sulfonic acid except in the last two examples of this series wherein butyl phosphoric acid was used, as "Butyl Phos."
STY = Styrene.
MMA = Methylmethacrylate.
EA = Ethyl acrylate.
BA = Butyl acrylate.
AA = Acrylic acid.
HPA = Hydroxypropylacrylate.

What is claimed is:
1. Coating composition comprising:
   (1) an interpolymer of:
      (a) from about 10 to 90 parts by weight of a mixture of an alkyl acrylate having between 4 and 15 carbon atoms and an alkyl methacrylate having between 5 and 15 carbon atoms; and
      (b) from about 1 to 20 parts by weight of at least one combined compound selected from the group consisting of an $\alpha,\beta$-olefinically unsaturated carboxylic acid containing up to about 10 carbon atoms, ethylene glycol monoacrylate, ethylene glycol monomethacrylate, propylene glycol monoacrylate, propylene glycol monomethacrylate, and trimethylol propane monoallyl ether; said interpolymer having a reduced viscosity of about 0.1 to 0.8 when measured as a 0.2 g. sample in 100 ml. of tetrahydrofuran at 25° C. and a glass transition temperature above about 20° C.;
   (2) from about 1 to 30 percent by weight, based on the weight of interpolymer, of a reactive flexibilizer selected from the group consisting of castor oil, polymerized castor oil, ricinoleic acid, ricinoleyl alcohol and hydroalkyl ricinoleates; and
   (3) from about 5 to 35 percent by weight, based on the weight of interpolymer, of a potentially thermosetting resin formed by the condensation of formaldehyde with a member selected from the group consisting of phenols, urea, benzoguanamine and melamine.

2. Coating composition claimed in claim 1 wherein the interpolymer is a tetra polymer containing methyl methacrylate, ethyl acrylate, propylene glycol monoacrylate and acrylic acid interpolymerized therein.

3. Composition claimed in claim 1 wherein the interpolymer is a terpolymer containing methyl methacrylate, ethyl acrylate, and acrylic acid.

References Cited
UNITED STATES PATENTS

| | | | |
|---|---|---|---|
| 3,344,097 | 9/1967 | Flegenheimer | 260—21 |
| 2,097,754 | 11/1937 | Bradshaw. | |
| 2,129,694 | 9/1938 | Izard. | |
| 2,398,350 | 4/1946 | Atwood et al. | |
| 2,889,236 | 6/1959 | Hahn. | |
| 3,065,109 | 11/1962 | Hensley | 260—22 |
| 3,068,183 | 12/1962 | Strolle | 260—21 |
| 3,150,048 | 9/1964 | Hollub et al. | |
| 3,288,736 | 11/1966 | Wright et al. | |

DONALD E. CZAJA, *Primary Examiner.*

R. W. GRIFFIN, *Assistant Examiner.*

U.S. Cl. X.R.

117—134, 167; 260—21, 23, 844, 851, 856